(12) United States Patent
Kawahara

(10) Patent No.: US 12,194,850 B2
(45) Date of Patent: Jan. 14, 2025

(54) VEHICLE DISPLAY DEVICE

(71) Applicant: Panasonic Intellectual Property Management Co., Ltd., Osaka (JP)

(72) Inventor: Noriyuki Kawahara, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 397 days.

(21) Appl. No.: 17/691,555

(22) Filed: Mar. 10, 2022

(65) Prior Publication Data

US 2022/0314796 A1    Oct. 6, 2022

(30) Foreign Application Priority Data

Mar. 30, 2021    (JP) ................................ 2021-056906

(51) Int. Cl.
| | | |
|---|---|---|
| *B60K 35/00* | (2024.01) | |
| *B60K 35/10* | (2024.01) | |
| *B60K 35/81* | (2024.01) | |

(52) U.S. Cl.
CPC .............. *B60K 35/00* (2013.01); *B60K 35/10* (2024.01); *B60K 35/81* (2024.01); *B60K 2360/148* (2024.01); *B60Y 2200/11* (2013.01)

(58) Field of Classification Search
CPC ........ B60K 35/00; B60K 35/10; B60K 35/81; B60K 2360/148; B60Y 2200/11
See application file for complete search history.

(56) References Cited

U.S. PATENT DOCUMENTS

| | | | |
|---|---|---|---|
| 9,384,647 B1 * | 7/2016 | Arnold ..................... | G01K 1/14 |
| 11,254,284 B2 * | 2/2022 | Sung ....................... | B60R 22/48 |
| 2012/0050021 A1 * | 3/2012 | Rao ......................... | B60K 28/12 |
| | | | 340/425.5 |
| 2015/0091280 A1 * | 4/2015 | Nagasawa ............. | B60R 21/013 |
| | | | 280/730.1 |
| 2015/0331105 A1 * | 11/2015 | Bell ....................... | G01S 7/4808 |
| | | | 356/4.01 |
| 2016/0379466 A1 * | 12/2016 | Payant ................... | G08B 21/22 |
| | | | 340/457 |

(Continued)

FOREIGN PATENT DOCUMENTS

| | | | | | |
|---|---|---|---|---|---|
| EP | | 3128769 A1 * | 2/2017 | ......... | G06K 9/00805 |
| EP | | 3107455 B1 * | 4/2023 | ........... | A61B 5/0022 |

(Continued)

OTHER PUBLICATIONS

JP 2016105557 A with English translation. Date published Jun. 9, 2016. (Year: 2016).*

(Continued)

*Primary Examiner* — Calvin Cheung
(74) *Attorney, Agent, or Firm* — Greenblum & Bernstein, P.L.C.

(57) ABSTRACT

A vehicle display device includes: a first sensor (microphone) that senses a vehicle interior; a region decider that decides a detection region which is a region for detecting a fallen object; a determiner that determines, based on the result of the sensing performed by the first sensor, whether an object has fallen; and a controller that decides display content based on a determination that the object has fallen and the detection region, and the controller causes a display to display the display content decided by the controller.

11 Claims, 4 Drawing Sheets

(56) References Cited

U.S. PATENT DOCUMENTS

| | | | |
|---|---|---|---|
| 2017/0034454 A1 | 2/2017 | Sawada | |
| 2017/0054949 A1* | 2/2017 | Shaw | G06V 20/593 |
| 2017/0297587 A1* | 10/2017 | Mimura | B60W 30/182 |
| 2018/0272937 A1 | 9/2018 | Kumon et al. | |
| 2018/0272948 A1 | 9/2018 | Kumon et al. | |
| 2020/0278743 A1* | 9/2020 | Hiroki | G06F 3/011 |

FOREIGN PATENT DOCUMENTS

| | | |
|---|---|---|
| JP | 2007-145310 | 6/2007 |
| JP | 2008-221989 | 9/2008 |
| JP | 2014-223887 | 12/2014 |
| JP | 2015-133050 | 7/2015 |
| JP | 2017-034453 | 2/2017 |
| JP | 2018-164186 | 10/2018 |
| JP | 2018-164187 | 10/2018 |
| JP | 2019-156134 | 9/2019 |
| JP | 2020-164003 | 10/2020 |

OTHER PUBLICATIONS

JP 3943367 B2 with English translation. Date published Jul. 11, 2007. (Year: 2007).*

JP 2004001591 A with English translation. Date published Jan. 8, 2004. (Year: 2004).*

JP 2017007548 A with English translation. Date published Jan. 12, 2017. (Year: 2017).*

WO 2017061521 A1 with English translation. Date published Apr. 13, 2017. (Year: 2017).*

Office Action from Japan Patent Office (JPO) in Japanese Patent Appl. No. 2021-056906, dated Feb. 14, 2023, together with an English language translation.

* cited by examiner

VEHICLE DISPLAY DEVICE

CROSS REFERENCE TO RELATED APPLICATION

The present application is based on and claims priority of Japanese Patent Application No. 2021-056906 filed on Mar. 30, 2021.

FIELD

The present disclosure relates to vehicle display devices.

BACKGROUND

PTL 1 discloses a vehicle interior monitoring device in which when a driver needs to concentrate on operating a vehicle, the driver's attention can be prevented from being drawn.

The vehicle interior monitoring device includes: a change detection means that detects a change in a passenger in the rear seat of the vehicle based on the level of sound generated by the passenger; a presentation means that presents video; and a presentation control means that causes, when the change in the passenger is detected, the presentation means to display the video of the rear seat. The presentation control means has a traveling state determination function of determining whether the state of travel of the vehicle is a steady traveling state, and when the vehicle is determined to be in the steady traveling state, the video of the rear seat is displayed whereas when the vehicle is determined to be in an unsteady traveling state, the video of the rear seat is prevented from being displayed.

PTL 2 discloses a display system in which even when a driver performs an operation during driving, the movement of a line of sight can be reduced.

The display system of PTL 2 includes: a sensor that detects a manual operation inside a vehicle; an imaging device that makes a video by imaging a region including part which is a target to be detected by the sensor and which is operated manually; a display control device that outputs the video made by the imaging in the imaging device; and a display device that displays the video.

CITATION LIST

Patent Literature

PTL 1: Japanese Unexamined Patent Application Publication No. 2014-223887
PTL 2: Japanese Unexamined Patent Application Publication No. 2019-156134

SUMMARY

The vehicle display device of PTL 1 described above can be improved upon.

In view of this, the vehicle display device of the present disclosure is capable of improving upon the above related art.

A vehicle display device according to an aspect of the present disclosure acquires a result of sensing by a first sensor that senses a vehicle interior, and includes: a region decider that decides a detection region which is a region for detecting a fallen object; a determiner that determines, based on a result of sensing performed by the first sensor, whether an object has fallen; and a controller that decides display content based on a determination that the object has fallen and the detection region, and the controller causes a display to display the display content decided by the controller.

These comprehensive or specific aspects may be realized by a system, a method, an integrated circuit, a computer program, or a computer-readable recording medium such as a CD-ROM or may be realized by any combination of a system, a method, an integrated circuit, a computer program, and a recording medium.

With the vehicle display device of the present disclosure, it is possible to achieve further improvement.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
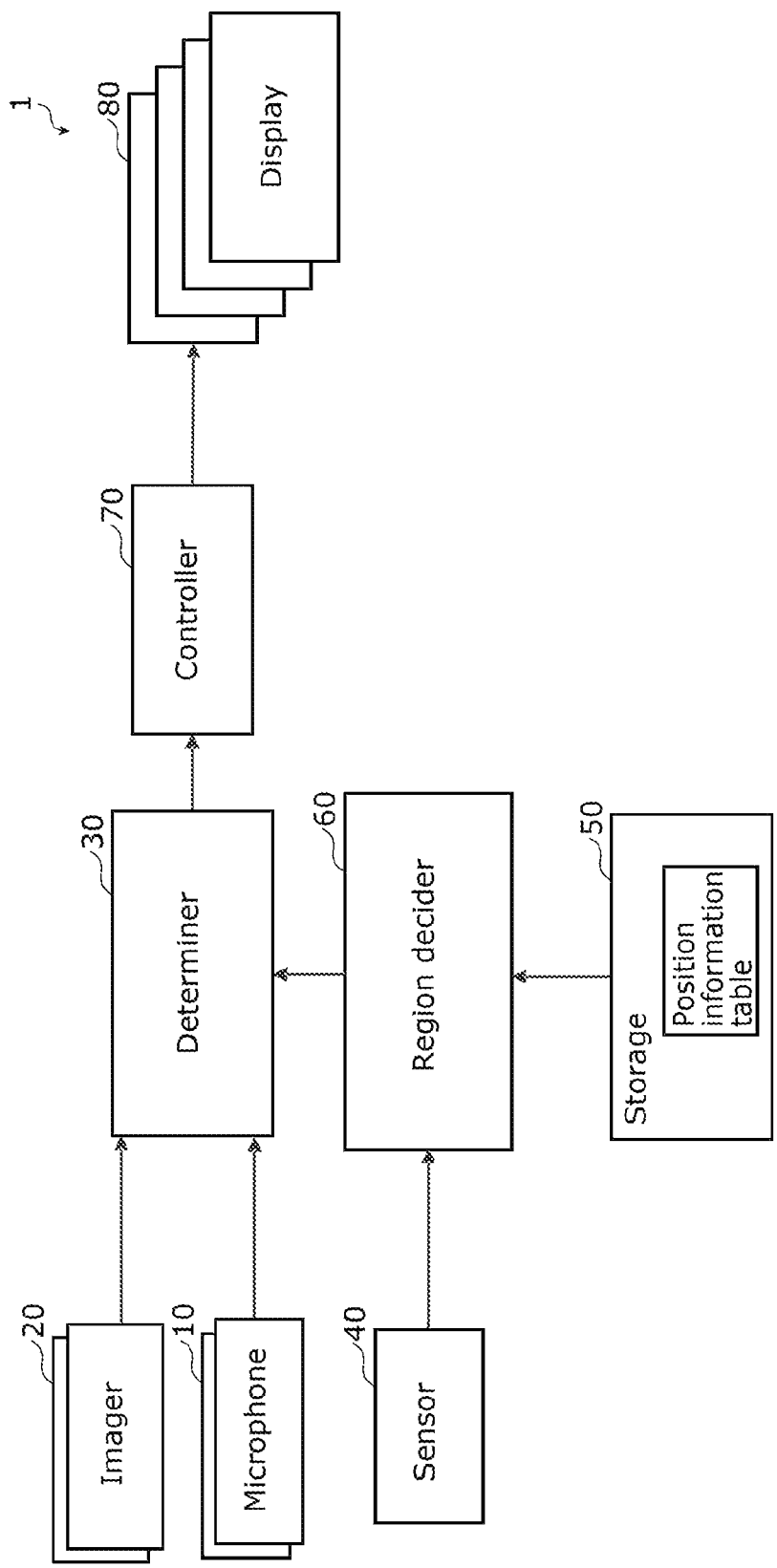
FIG. 1 is a block diagram illustrating a vehicle display device according to an embodiment.

In the vehicle interior monitoring device of PTL 1 and the display system of PTL 2 which are related arts, even when an object has suddenly fallen in the vehicle interior, measures are not taken to prevent the driver from unintentionally performing inattentive driving.

Hence, a vehicle display device according to an aspect of the present disclosure acquires a result of sensing by a first sensor that senses a vehicle interior, and includes: a region decider that decides a detection region which is a region for detecting a fallen object; a determiner that determines, based on a result of sensing performed by the first sensor, whether an object has fallen; and a controller that decides display content based on a determination that the object has fallen and the detection region, and the controller causes a display to display the display content decided by the controller.

Therefore, the vehicle display device can suppress the occurrence of inattentive driving.

Hence, an embodiment of the present disclosure will be described with reference to drawings. The embodiment described below shows a specific preferred example of the present disclosure. Thus, values, shapes, materials, constituent elements, the arrangements, positions, and connection forms of the constituent elements, and the like which are shown in the embodiment below are examples, and are not intended to limit the present disclosure. Therefore, among the constituent elements in the embodiment below, constituent elements which are not recited in the independent claim are described as arbitrary constituent elements.

The drawings each are schematic views, and are not exactly shown. Hence, in the drawings, the same constituent elements are identified with the same reference signs.

The embodiment will be specifically described below with reference to the drawings.

Embodiment

<Configuration: Vehicle Display Device 1>

The configuration of vehicle display device 1 according to the present embodiment will first be described.

Figure 2:
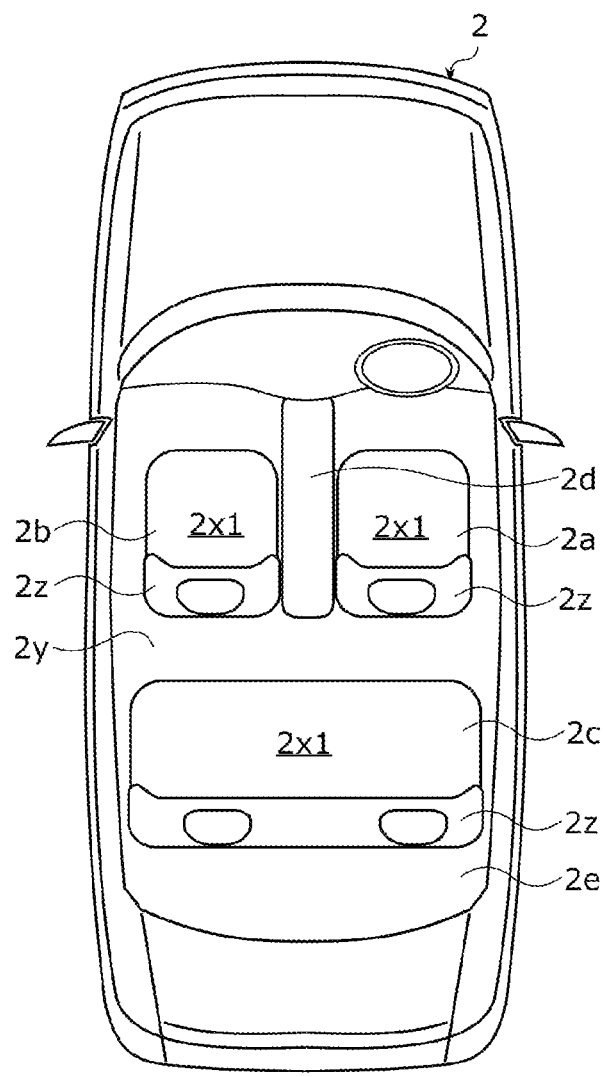
FIG. 2 is a schematic bird's eye view illustrating the state of the vehicle interior of a vehicle.

FIG. 1 is a block diagram illustrating vehicle display device 1 according to the embodiment. FIG. 2 is a schematic bird's eye view illustrating the state of the vehicle interior of vehicle 2.

As shown in FIGS. 1 and 2, vehicle display device 1 is installed in vehicle 2. Vehicle 2 includes driver seat 2a, passenger seat 2b, rear seat 2c, and center console box 2d. Driver seat 2a, passenger seat 2b, rear seat 2c, and center console box 2d are arranged in the vehicle interior of vehicle 2. Driver seat 2a and passenger seat 2b are arranged side by side on a front side in the direction of travel when vehicle 2 moves forward. In a case where driver seat 2a of the present embodiment is seen along the direction of travel when vehicle 2 moves forward, driver seat 2a is arranged on the right side. However, there is no limitation to this configuration. In a case where driver seat 2a of the present embodiment is seen along the direction of travel when vehicle 2 moves forward, driver seat 2a may be arranged on the left side. Between driver seat 2a and passenger seat 2b, center console box 2d is provided. Rear seat 2c is an elongated seat which extends along a left/right direction, and is arranged on a back side in the direction of travel when vehicle 2 moves forward, that is, is arranged behind driver seat 2a, passenger seat 2b, and center console box 2d. In vehicle 2 of the present embodiment, rear seat 2c which is formed with a row of seats is arranged. In vehicle 2, a plurality of rows of rear seats 2c each being formed with a row of seats may be arranged.

Vehicle display device 1 includes microphone 10, imager 20, determiner 30, sensor 40, storage 50, region decider 60, controller 70, and display 80.

Microphone 10 is provided in the vehicle interior, and picks up (collects) sound generated in the vehicle interior. Microphone 10 may be provided at any location in the vehicle interior, and may be provided at, for example, center console box 2d, a roof, a room mirror, a center cluster, a steering, a meter panel, or the like. Here, the sound generated in the vehicle interior is sound generated when an object has fallen, conversation sound of a driver, a passenger, or the like in the vehicle interior, or the like. Microphone 10 is an example of a first sensor which senses the vehicle interior.

A plurality of microphones 10 are provided in the vehicle interior. In other words, microphones 10 form a microphone array. Specifically, the microphone array includes two or more microphones 10 which are arranged apart from each other, sequentially picks up sound generated in the vehicle interior, and acquires sound signals (an example of the result of sensing) obtained by converting the sound sequentially picked up into electrical signals. The microphone array outputs the sequentially acquired sound signals to determiner 30.

Imager 20 is provided in the vehicle interior, and is capable of imaging the vehicle interior. Imager 20 images the vehicle interior to sequentially generate pieces of image data (an example of the result of sensing), and outputs, to determiner 30, the pieces of image data which are sequentially generated. The pieces of image data sequentially generated by imager 20 may be sequentially stored in storage 50 or the like so as to be associated with time information indicating the current time. Imager 20 is, for example, a device which includes an optical system such as a lens and an image sensor. Imager 20 may be a radar, an infrared sensor, or the like. Imager 20 may be an example of a second sensor or may be an example of the first sensor which senses the vehicle interior.

Determiner 30 acquires, from microphones 10, the sound signals indicating the sound generated in the vehicle interior to identify the direction of a sound source which is the direction of arrival of the sound picked up by microphones 10. For example, determiner 30 calculates, based on the sound signals, a time difference, that is, a phase difference in the sound which reaches microphones 10 of the microphone array, and thereby can identify the direction of the sound source.

Determiner 30 identifies, based on the direction of the sound source which is identified, the location of the fallen object. The location of the fallen object is not a position serving as a point but a region which includes a position where the object has fallen and which is around the position.

In the present embodiment, determiner 30 identifies the location of the fallen object based on a change in the pieces of image data of the vehicle interior imaged by imager 20. Specifically, since the pieces of image data are sequentially stored in storage 50 or the like so as to be associated with the time information, determiner 30 compares the pieces of image data stored in storage 50 to be able to recognize a change in the pieces of image data, that is, a change in the position of the object included in the pieces of image data. In this way, determiner 30 identifies, as the location of the fallen object, a location where a change in the position of the object included in the pieces of image data is produced. Since regions in the vehicle interior are limited regions, determiner 30 may identify a region in the direction of the sound source as the location of the fallen object.

Although in the present embodiment, determiner 30 uses the pieces of image data of the vehicle interior imaged by imager 20 and the sound picked up by microphones 10 to identify the location of the fallen object, determiner 30 may identify the location of the fallen object without use of the pieces of image data or may identify the location of the fallen object without use of the sound picked up by microphones 10. In other words, determiner 30 may identify the location or direction of the object using only the pieces of image data of the vehicle interior imaged by imager 20 or using only the sound signals indicating a change in the sound picked up by microphones 10. Hence, vehicle display device 1 may include only microphones 10 or imager 20.

As described above, determiner 30 determines whether a change in the sound is generated in the vehicle interior, that is, determines whether the object has fallen based on the sound signals of microphones 10 and/or the pieces of image data of imager 20 in the vehicle interior, and identifies the location of the fallen object to determine that the object in the vehicle interior has fallen.

Storage 50 is a storage device which stores programs executed by region decider 60 and the like. Storage 50 also stores a position information table for specifying a detection region. Storage 50 is realized by, for example, a semiconductor memory or the like.

Sensor 40 is provided in the vehicle interior to be able to detect a passenger who is present in the vehicle interior. Sensor 40 senses the vehicle interior to detect the passenger present in the vehicle interior and the position of the passenger, and associates the detected passenger with the position of the passenger. Sensor 40 sequentially generates pieces of detection information in which the detected passenger is associated with the position of the passenger, and outputs, to region decider 60, the pieces of detection information which are sequentially generated. Although sensor 40 is a human detection sensor, sensor 40 may be, for example, an imaging device which includes an optical system such as a lens and an image sensor, a laser radar, an infrared sensor, or the like. Sensor 40 is an example of the second sensor.

Region decider 60 decides the detection region which is a region for detecting a fallen object. Specifically, region decider 60 decides the detection region based on the position information table in storage 50. For example, region decider 60 decides the detection region which excludes a location at which a passenger other than a driver who drives vehicle 2 sits and a region around the passenger. When sensor 40 detects a passenger sitting on rear seat 2c, region decider 60 excludes, as a region around the passenger, the whole of rear seat 2c and a region around rear seat 2c from the detection region.

When vehicle 2 includes a row of driver seat 2a and passenger seat 2b and a plurality of rows of rear seats 2c, the detection region may be set for each of the rows of rear seats 2c. In this case, region decider 60 may individually exclude any of the rows of rear seats 2c from the detection region. Hence, when a plurality of rows of rear seats 2c are present, the exclusion of the whole of rear seat 2c and the region around rear seat 2c is not limited to the exclusion of all rear seats 2c and all regions around rear seats 2c from the detection region. Hence, the determination as to whether an object has fallen may be performed for each of the rows of rear seats 2c.

Here, as shown in FIG. 2, the detection region is a region in the vehicle interior in which an object may fall. The detection region is previously determined as an initial value, and is, for example, floor surface in legroom 2y, seat surfaces 2×1 of driver seat 2a, passenger seat 2b, rear seat 2c and the like, luggage room 2e, and the like. In order to suppress an erroneous determination, seat bags 2z for the seats present in the vehicle interior are excluded from the detection region. As described above, the detection region may be changed depending on the location at which the passenger other than the driver sits. For example, the detection region is assumed to be the remaining region in the vehicle interior other than the location at which the passenger other than the driver sits and a region around the passenger. When the passenger sits on rear seat 2c, the detection region is assumed to be the remaining region other than rear seat 2c and a region around rear seat 2c.

By the presence of a passenger, the location at which the passenger sits and the region around the passenger are excluded from the detection region for the following reasons. Firstly, sensor 40 may perform an erroneous determination due to the movement of the passenger and sound generated by the passenger. Then, even when an object which has fallen from the side of the seat on which the passenger sits generates sound, since the driver considers that the passenger can take any action for it, the risk for inattentive driving is unlikely to be increased.

For these reasons, region decider 60 changes the location of the detection region depending on whether the passenger is present in the vehicle interior.

When region decider 60 decides the detection region, region decider 60 transmits information indicating the decided detection region to controller 70.

When controller 70 acquires the information indicating the detection region from region decider 60, controller 70 decides display content based on the determination that an object has fallen and the detection region indicated in the acquired information. Specifically, when it is determined that an object has fallen, controller 70 decides, as the display content, the location of the fallen object and a region around the location. In other words, the display content indicates image data indicating the location of the fallen object in the detection region and the region around the location and on which one of a plurality of displays 80 a display of the image data is produced.

When controller 70 decides the display content, controller 70 outputs the decided image data to display 80 corresponding to the display content. For example, controller 70 causes display 80 present in the line of sight of the driver to display the display content. In other words, since a plurality of displays 80 are provided in vehicle 2, controller 70 causes display 80 present in the line of sight of the driver among displays 80 to display the decided display content. For example, when sensor 40 includes an imaging device capable of imaging the eyes of the driver, the line of sight of the driver can be derived by use of a line-of-sight detection means including sensor 40.

Display 80 displays the display content decided by controller 70. A plurality of displays 80 are provided in the vehicle interior. Hence, at least part of displays 80 display the image data according to the display content decided by controller 70.

Display 80 is arranged on a front side of vehicle 2 and in a position which does not intersect the line of sight of the driver when the driver drives vehicle 2 while facing forward. The position which does not intersect the line of sight is a position outside the line of sight of the driver when the driver drives vehicle 2 while facing forward, that is, a position which is out of the line of sight. Display 80 is arranged, for example, around vehicle instruments or in an instrument panel or the like. Display 80 is a monitor which can display video, images or characters on a navigation system display, a meter panel or the like.

<Processing Operation>

A processing operation in vehicle display device 1 according to the present embodiment will then be described.

Operation Example 1

In the present operation example, the overall processing operation in vehicle display device 1 will be described with reference to FIG. 3.

Figure 3:
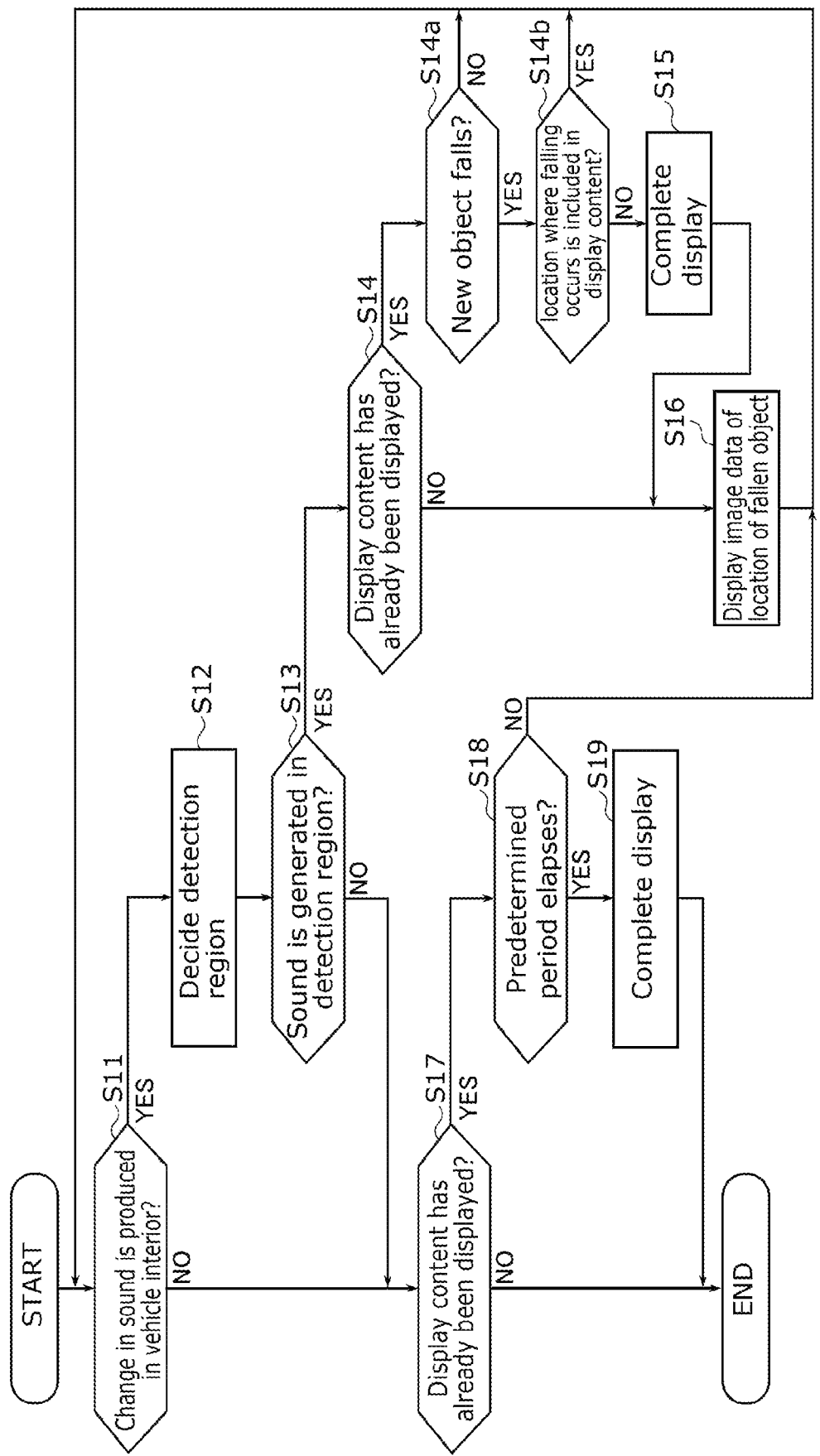
FIG. 3 is a flowchart illustrating a processing operation in the vehicle display device according to the embodiment.

FIG. 3 is a flowchart illustrating the processing operation in vehicle display device 1 according to the embodiment.

As shown in FIG. 3, determiner 30 determines whether a change in sound is produced in the vehicle interior (S11). In other words, determiner 30 determines whether a change in sound signals sequentially acquired from a plurality of microphones 10 (microphone array) is produced.

When determiner 30 determines that a change in the sound signals sequentially acquired from microphones 10 (microphone array) is produced (yes in S11), region decider 60 decides a detection region which is a region for detecting a fallen object (S12).

Determiner 30 determines whether a location (the location of sound generated by the fallen object) indicated by the sound signals sequentially acquired from microphones 10 (microphone array) is in the detection region (S13). Specifically, determiner 30 identifies the location of the fallen object based on the direction of a sound source which is identified. Here, determiner 30 identifies the location of the fallen object based on a change in pieces of image data sequentially acquired from imager 20.

When determiner 30 identifies, based on a change in the pieces of image data, the location of the fallen object to determine that the location indicated by the sound signals is in the detection region (yes in S13), determiner 30 outputs, to controller 70, the pieces of image data including the location of the fallen object in the detection region.

Controller 70 determines whether display content is displayed on display 80, that is, whether the pieces of image data including the location of the fallen object are displayed on display 80 (S14).

When controller 70 determines that the display content has already been displayed on display 80 (yes in S14), determiner 30 determines whether a new object has fallen (S14a). In the determination of step S14a, as in step S13, determiner 30 determines, based on, for example, the sound signals and the like, whether the new object has fallen.

When determiner 30 determines that the new object does not fall (no in S14a), the display of the display content displayed on display 80 is completed, and vehicle display device 1 returns the processing operation to step S11.

When determiner 30 determines that the new object has fallen (yes in S14a), determiner 30 determines whether a location where the falling occurs is included in the display content (S14b). In other words, determiner 30 determines whether the new object has fallen in a location other than locations included in the display content displayed on display 80.

When determiner 30 determines that the location where the falling occurs is included in the display content (yes in S14b), for example, controller 70 may display the display content displayed on display 80 for a certain period of time and then complete the display of the display content displayed on display 80. Then, vehicle display device 1 returns the processing operation to step S11.

When determiner 30 determines that the location where the falling occurs is not included in the display content (no in S14b), controller 70 completes the display of the display content displayed on display 80 (S15) and displays pieces of image data including the location of the fallen object on display 80 (S16). When as described above, determiner 30 determines that an object has fallen in a different location, controller 70 overwrites the display content displayed on display 80, and performs step S16 after step S15 in order to display pieces of image data including the location of the fallen object in the different location.

Then, vehicle display device 1 returns the processing operation to step S11. Controller 70 may complete the processing after step S15 or may return the processing to step S11.

On the other hand, when controller 70 determines that the display content has not been displayed on display 80 (no in S14), the pieces of image data including the location of the fallen object are displayed on display 80 (S16). Then, vehicle display device 1 returns the processing operation to step S11.

When determiner 30 determines that a change in the sound signals sequentially acquired from microphones 10 (microphone array) is not produced (no in S11) or determines that the sound signals are not generated in the detection region (no in S13), the processing operation proceeds to step S17.

Controller 70 determines whether the display content has been displayed on display 80, that is, whether the pieces of image data including the detection region have been displayed on display 80 (S17).

When controller 70 determines that the display content has not been displayed on display 80 (no in S17), vehicle display device 1 completes the processing operation in FIG. 3.

When controller 70 determines that the display content has been displayed on display 80 (yes in S17), controller 70 determines whether a predetermined period elapses after the display of the display content (S18).

When controller 70 determines that the predetermined period elapses after the display of the display content (yes in S18), controller 70 completes the display of the display content displayed on display 80 (S19), and vehicle display device 1 completes the processing operation in FIG. 3.

When controller 70 determines that the predetermined period does not elapse after the display of the display content (no in S18), vehicle display device 1 returns the processing operation to step S11.

Operation Example 2

A processing operation in which region decider 60 decides the detection region will then be described.

Figure 4:
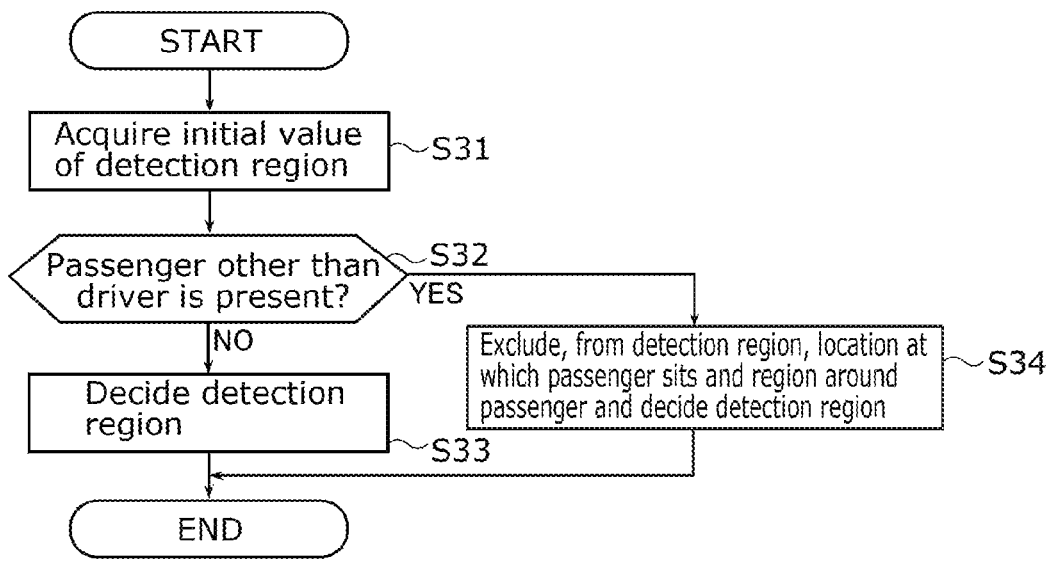
FIG. 4 is a flowchart illustrating a processing operation in the vehicle display device according to the embodiment.

FIG. 4 is a flowchart illustrating the processing operation in vehicle display device 1 according to the embodiment.

As shown in FIG. 4, region decider 60 acquires the initial value of the detection region from storage 50 (S31). Examples of the initial value of the detection region include floor surface in legroom 2y, seat surfaces 2×1 of driver seat 2a, passenger seat 2b, rear seat 2c and the like, luggage room 2e, and the like.

Region decider 60 decides the detection region based on whether a passenger other than the driver is present in the vehicle interior (S32).

When sensor 40 detects the presence of the passenger other than the driver in the vehicle interior, that is, when the destination information is acquired from sensor 40 (yes in S32), region decider 60 decides, based on the position information table read from storage 50, the detection region where a location at which the passenger other than the driver who drives vehicle 2 sits and a region around the passenger are excluded (S34). For example, when sensor 40 detects a passenger sitting on rear seat 2c, region decider 60 excludes, as the location at which the passenger sits and the region around the passenger, the whole of rear seat 2c and a region around rear seat 2c. Then, region decider 60 completes the processing operation in FIG. 4.

When sensor 40 does not detect the presence of the passenger other than the driver in the vehicle interior, that is, when the destination information is not acquired from sensor 40 (no in S32), region decider 60 decides, based on the position information table read from storage 50, the detection region (S33). For example, region decider 60 decides, as the detection region, all detection regions which are previously determined. Then, region decider 60 completes the processing operation in FIG. 4.

<Functional Effects>

Functional effects in vehicle display device 1 according to the present embodiment will then be described.

As described above, vehicle display device 1 according to the present embodiment acquires a result of sensing by the first sensor (microphone 10) that senses the vehicle interior, and includes: region decider 60 that decides the detection region which is a region for detecting a fallen object; determiner 30 that determines, based on the result of the sensing performed by the first sensor, whether an object has fallen; and controller 70 that decides the display content based on the determination that the object has fallen and the detection region. Controller 70 causes display 80 to display the display content decided by controller 70.

Incidentally, in general, one of causes for the occurrence of a vehicle accident is inattentive driving. One of causes for the occurrence of inattentive driving is the sudden falling of an object. For example, when an object has suddenly fallen in a vehicle interior (for example, sound generated by a fallen object), a driver is concerned about the unintentional occurrence of the fallen object to see the fallen object, with the result that the driver may perform inattentive driving. In a conventional vehicle display device, measures are not taken at all to prevent a driver from unintentionally performing inattentive driving due to the sudden falling of an object as described above.

Hence, in the present embodiment, determiner 30 can determine, from the result of the sensing of the vehicle interior, whether an object has fallen. For example, when determiner 30 determines that the object has fallen, display 80 can display the display content based on the detection region. Therefore, the driver can check the display content displayed on display 80, for example, without turning around to see the side of the fallen object, and thus it is possible to suppress an increase in the amount of movement of the line of sight of the driver.

Hence, in vehicle display device 1, the occurrence of inattentive driving can be suppressed.

In vehicle display device 1 according to the present embodiment, the first sensor is microphone 10 which picks up sound in the vehicle interior.

In this way, determiner 30 can determine, from the sound picked up by microphone 10, whether an object has fallen. For example, when determiner 30 determines that the object has fallen, display 80 can display the display content based on the detection region. Hence, the driver can check the display content displayed on display 80, for example, without turning around to see the direction in which the sound is generated, and thus it is possible to suppress an increase in the amount of movement of the line of sight of the driver.

In vehicle display device 1 according to the present embodiment, determiner 30 identifies the direction of the sound source which is the direction of arrival of the sound picked up by microphone 10, identifies, based on the direction of the sound source which is identified, the location of the fallen object, and determines, when the identified location is included in the detection region, that the object has fallen.

In this way, it is possible to identify the direction of the sound source in which the object has fallen and the location at which the object has fallen.

In vehicle display device 1 according to the present embodiment, determiner 30 identifies, based on a change in the image data of the vehicle interior imaged by imager 20, the location of the fallen object and determines, when the identified location is included in the detection region, that the object has fallen.

In this way, it is possible to accurately identify the direction of the sound source in which the object has fallen and the location at which the object has fallen.

In vehicle display device 1 according to the present embodiment, when it is determined that the object has fallen, controller 70 decides, as the display content, the detection region including the location of the fallen object and the region around the location.

In this way, display 80 can display the location of the fallen object and the region around the location. Hence, the driver can check the location of the fallen object and the region around the location, with the result that the driver does not see the direction in which the sound is generated.

Vehicle display device 1 according to the present embodiment includes storage 50 which stores the position information table for specifying the detection region. Region decider 60 decides the detection region based on the position information table in storage 50.

In this way, the position information table is used to be able to easily decide the detection region. Hence, an appropriate detection region can be decided, and thus it is possible to display appropriate display content to the driver.

Vehicle display device 1 according to the present embodiment acquires a result of sensing by the second sensor (sensor 40) which detects the passenger who is present in the vehicle interior. Region decider 60 decides the detection region that excludes the location at which the passenger other than the driver who drives vehicle 2 sits and the region around the passenger.

In this way, the location in which the passenger other than the driver is present and the region around the location are excluded from the detection region, and thus it is possible to ensure the accuracy of a determination as to whether an object has fallen. In other words, in vehicle display device 1, an erroneous determination can be suppressed.

In vehicle display device 1 according to the present embodiment, when the second sensor detects the passenger sitting on rear seat 2c, region decider 60 excludes, as the region around the passenger, the whole of rear seat 2c from the detection region.

In this way, even when an object which has fallen from the side of the seat on which the passenger sits generates sound, since the driver considers that the passenger can take any action for it, the whole of rear seat 2c is excluded from the detection region, with the result that it is possible to ensure the accuracy of the determination as to whether an object has fallen. In other words, in vehicle display device 1, an erroneous determination can be suppressed.

In vehicle display device 1 according to the present embodiment, display 80 is arranged in a position which does not intersect the line of sight of the driver who drives vehicle 2 while facing forward.

In this way, display 80 can be arranged on the side of the line of sight of the driver who faces in the direction of travel when the driver drives vehicle 2. Hence, even when sound is suddenly generated by a fallen object in the vehicle interior, since the driver can check, while facing forward, a location in which the sound is generated, it is possible to suppress an increase in the amount of movement of the line of sight when the driver drives vehicle 2 so as not to prevent the driving of the driver. Consequently, in vehicle display device 1, the occurrence of inattentive driving can be more suppressed.

In vehicle display device 1 according to the present embodiment, controller 70 causes display 80 which is present in the line of sight of the driver to display the display content.

In this way, in a case where determiner 30 determines that an object has fallen when the line of sight of the driver is directed to the display device, the display content can be displayed on the display device which is present in the line of sight of the driver. Hence, the driver can easily check the display content displayed on display 80, and thus it is possible to more suppress an increase in the amount of movement of the line of sight of the driver.

Variation of Embodiment

The present variation differs from the display control system of the embodiment, for example, in that the characteristic of a person is determined. Unless otherwise specified, other configurations in the present variation are the same as in the embodiment, the same configurations are identified with the same reference signs, and detailed description of the configurations will be omitted.

A processing operation in vehicle display device 1 according to the present variation will be described.

Figure 5:
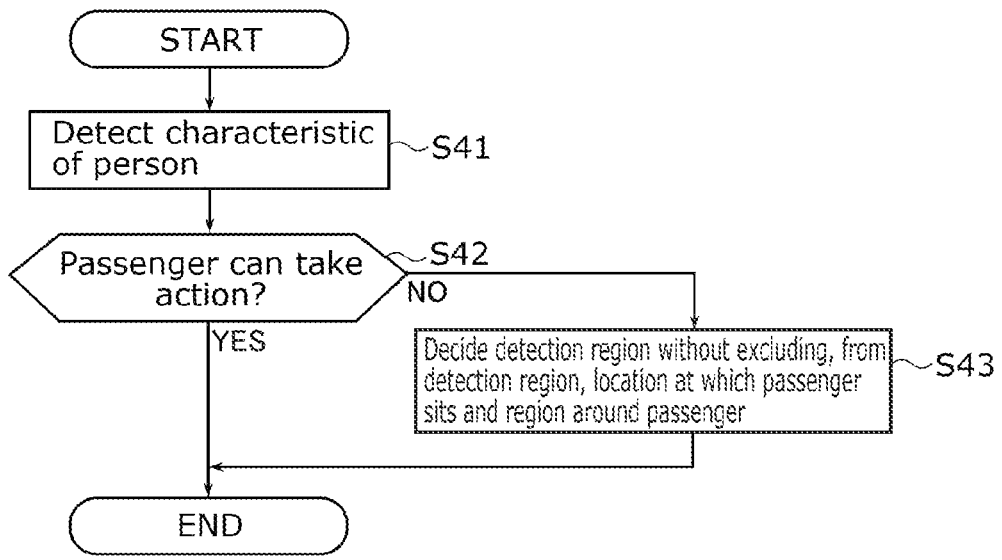
FIG. 5 is a flowchart illustrating a processing operation in a vehicle display device according to a variation of the embodiment.

FIG. 5 is a flowchart illustrating the processing operation in vehicle display device 1 according to the variation of the embodiment.

Sensor 40 detects the characteristic of a passenger who is present in the vehicle interior (S41). Sensor 40 associates passenger information serving as information indicating the characteristic of the passenger that is detected with location information serving as information indicating a location in which the passenger is present, and outputs the resulting information to determiner 30. The characteristic of the passenger is, for example, the size of the passenger, the features of the passenger, or the like, and is the characteristic of the person for determining whether the passenger is an adult or a child. In other words, the passenger information includes information indicating the size of the passenger which is detected, information indicating the features of the passenger which are detected, and the like.

Sensor 40 may detect the size of the passenger, for example, based on an image of the passenger shot with imager 20. Sensor 40 may use, for example, a face image included in the image of the passenger shot with imager 20 to detect the features of the passenger.

Determiner 30 acquires, from sensor 40, the passenger information and the location information associated with the passenger information. Determiner 30 determines, based on the passenger information, whether the passenger is an adult or a child. When the passenger is a child, it is likely that the passenger cannot take any action. On the other hand, when the passenger is an adult, it can be considered that the passenger can take any action.

For example, the following method can be adopted for the determination as to whether the passenger is an adult or a child.

In a case where the passenger information is information indicating the size of the passenger, when the size of the passenger is less than a predetermined value, determiner 30 can determine that the passenger is a child. In a case where the passenger information is information indicating the features of the passenger, determiner 30 performs face recognition (personal authentication) by checking the information with the database of persons which is previously held, and thereby can determine that the passenger is a child. Determiner 30 may use both the information indicating the size of the passenger which is detected and the information indicating the features of the passenger which are detected so as to determine whether the passenger is an adult or a child.

Hence, determiner 30 determines, based on the passenger information, whether the passenger can take action (S42).

When the passenger based on the passenger information is an adult, determiner 30 determines that the passenger can take action (yes in S42). In this case, region decider 60 decides the detection region based on the position information table read from storage 50. Then, vehicle display device 1 completes the processing operation in FIG. 5.

When the passenger based on the passenger information is a child, determiner 30 determines that the passenger cannot take action (no in S42). Region decider 60 decides the detection region based on the position information table read from storage 50 without excluding a location at which the passenger other than the driver who drives vehicle 2 sits and a region around the passenger (S43). Then, vehicle display device 1 completes the processing operation in FIG. 5.

Even when in step S43, the passenger is present, on display 80, the display content is displayed, that is, the image data including the location of the fallen object is displayed.

Although when passengers of a child and an adult sit on rear seat 2c, region decider 60 excludes, from the detection region, locations at which the passengers sit and regions around the passengers, when only children sit on passenger seat 2b and rear seat 2c, a configuration may be adopted in which region decider 60 does not exclude, from the detection region, locations at which the passengers sit and regions around the passengers.

Vehicle display device 1 according to the present variation as described above acquires a result of sensing by the second sensor which detects the passenger who is present in the vehicle interior. The second sensor detects the characteristic of the passenger. Then, controller 70 decides the display content based on the characteristic of the passenger.

In this way, for example, when as an example of the characteristic of the passenger, the size of the passenger is small, the passenger is a child, and thus in this case, the detection region can be decided such that a location at which the child sits and a region around the passenger are prevented from being excluded from the detection region. When the passenger is determined to be a child by face recognition, the detection region can be decided such that a location at which the child sits and a region around the passenger are prevented from being excluded from the detection region. Hence, the driver can check the location of the fallen object and the region around the location.

(Other Variations)

Although the vehicle display device according to the present disclosure has been described above based on the embodiment described above, the present disclosure is not limited to the embodiment. Various variations of the embodiment conceived by a person skilled in the art without departing from the spirit of the present disclosure may be included in the scope of the present disclosure.

For example, portions included in the vehicle display device according to the embodiment described above are typically realized as an LSI circuit which is an integrated circuit. Each of them may be integrated into one chip or they may be integrated into one chip so as to include part or all of them.

The integration is not limited to LSI, and may be realized by a dedicated circuit or a general-purpose processor. A field programmable gate array (FPGA) which can be programmed after the manufacturing of an LSI circuit or a reconfigurable processor in which the connection and setting of circuit cells inside an LSI circuit can be reconfigured may be utilized.

Constituent elements in the embodiment described above may be formed with dedicated hardware or may be realized by executing software programs suitable for the constituent elements. A program executer such as a CPU or a processor may read and execute software programs recorded in a recording medium such as a hard disk or a semiconductor memory to realize the constituent elements.

All the numbers used in the above description are used as examples for specifically describing the present disclosure, and the embodiment of the present disclosure is not limited to the numbers which are used as examples.

The division of functional blocks in the block diagram is an example, and a plurality of functional blocks may be realized as one functional block, one functional block may be divided into a plurality of blocks, or part of functions may be transferred to another functional block. The functions of a plurality of functional blocks which have similar functions may be processed by a single hardware or software unit in parallel or in a time division manner.

The order in which the steps in the flowchart are performed is used as an example for specifically describing the present disclosure, and an order other than the order described above may be adopted. Part pf the steps may be performed at the same time (in parallel) with another step.

Embodiments obtained by performing, on the embodiment described above, various variations conceived by a person skilled in the art and embodiments realized by arbitrarily combining the constituent elements and functions in the embodiment described above without departing from the spirit of the present disclosure are also included in the present disclosure.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent applications including specification, drawings and claims are incorporated herein by reference in their entirety: Japanese Patent Application No. 2021-056906 filed on Mar. 30, 2021.

INDUSTRIAL APPLICABILITY

The present disclosure can be utilized, for example, for devices and vehicles capable of suppressing the occurrence of inattentive driving performed by a driver who drives a vehicle.

The invention claimed is:

1. A vehicle display device acquiring a result of sensing by a first sensor that senses a vehicle interior, the vehicle display device comprising:
a second sensor that detects one or more persons present in the vehicle interior;
a region decider that decides a detection region for detecting a fallen object;
a determiner that determines, based on the result of the sensing by the first sensor, whether an object has fallen; and
a controller that decides display content based on a determination, by the determiner, that the object has fallen and the detection region,
wherein the controller causes a plurality of displays to display the display content decided by the controller,
the detection region includes one of a first detection region or a second detection region,
when the second sensor detects a person sitting on a seat other than a driver seat, the detection region includes the second detection region, with the second detection region excluding a seat surface on which the person sits and a floor surface including legroom of the person, and
when the second sensor does not detect the person sitting on the seat other than the driver seat, the detection region includes the first detection region, with the first detection region including the seat surface and the floor surface.

2. The vehicle display device according to claim 1, wherein the first sensor is a microphone that picks up sound in the vehicle interior.

3. The vehicle display device according to claim 2, wherein the determiner
identifies a direction of a sound source that is a direction of arrival of the sound picked up by the microphone,
identifies, based on the direction of the sound source that is identified, a location of the object that has fallen, and
determines, when the location identified is included in the detection region, that the object has fallen.

4. The vehicle display device according to claim 2, wherein, when the determiner determines that the object has fallen, the controller decides the display content, with the display content including a location of the object fallen and a region around the location.

5. The vehicle display device according to claim 1, wherein the determiner
identifies, based on a change in image data of the vehicle interior imaged by an imager, a location of the object fallen and
determines, when the location identified is included in the detection region, that the object has fallen.

6. The vehicle display device according to claim 1, further comprising:
a storage that stores a position information table for specifying the detection region,
wherein the region decider decides the detection region based on the position information table in the storage.

7. The vehicle display device according to claim 1, wherein the vehicle display device acquires a result of sensing by the second sensor that detects the one or more persons present in the vehicle interior,
the second sensor detects a characteristic of the one or more persons, and
the controller decides the display content based on the characteristic of the person one or more persons.

8. The vehicle display device according to claim 1, wherein, when the seat other than the driver seat is a rear seat, the second detection region further excludes a whole of a rear seat region of the rear seat.

9. The vehicle display device according to claim 1, wherein the plurality of displays is arranged on a front side of a vehicle in a position that does not intersect a line of sight of a driver who drives the vehicle, while the driver is facing forward.

10. The vehicle display device according to claim 1, wherein the plurality of displays is arranged on a front side of a vehicle, and
the controller causes one display of the plurality of displays that is present in a line of sight of a driver to display the display content.

11. A vehicle display device acquiring a result of sensing by a first sensor that senses a vehicle interior, the vehicle display device comprising:
a second sensor that detects one or more persons present in the vehicle interior;
a processor; and
a memory including at least one program that, when executed by the processor, causes the processor to perform operations, the operations including:
deciding a detection region for detecting a fallen object;
determining, based on the result of the sensing by the first sensor, whether an object has fallen; and
deciding display content based on a determination that the object has fallen and the detection region, wherein the processor causes a plurality of displays to display the display content decided by the processor, the detection region includes one of a first detection region or a second detection region, when the second sensor detects a person sitting on a seat other than a driver seat, the detection region includes the second detection region, with the second detection region excluding a seat surface on which the person sits and a floor surface including legroom of the person, and when the second sensor does not detect the person sitting on the seat other than the driver seat, the detection region includes the first detection region, with the first detection region including the seat surface and the floor surface.

\* \* \* \* \*